Dec. 25, 1956
A. D. BENNETT ET AL
2,775,120
FLUID ENTRY DETECTION IN WELLS
Filed Jan. 2, 1953
3 Sheets-Sheet 3
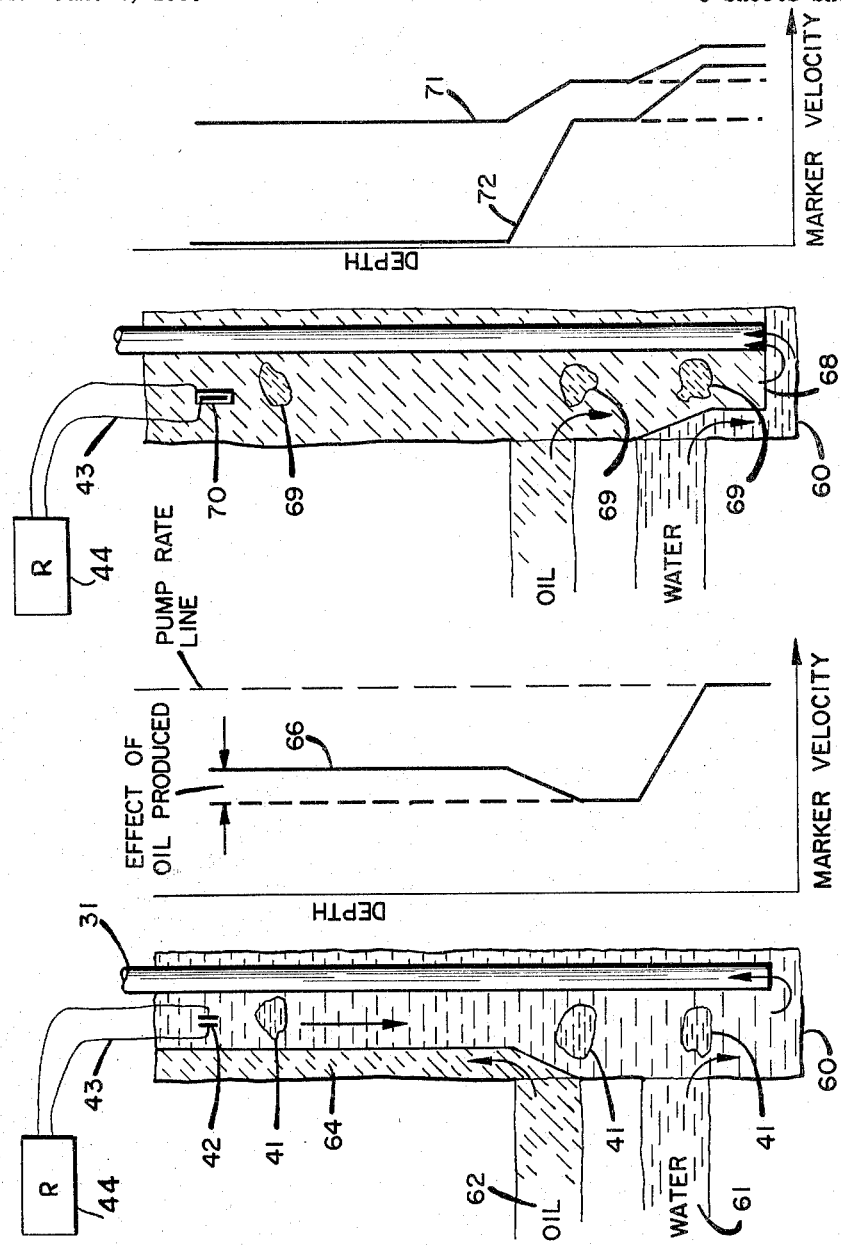
ARTHUR D. BENNETT
DANIEL SILVERMAN
*INVENTORS*
BY Newell Pottorf
*ATTORNEY*

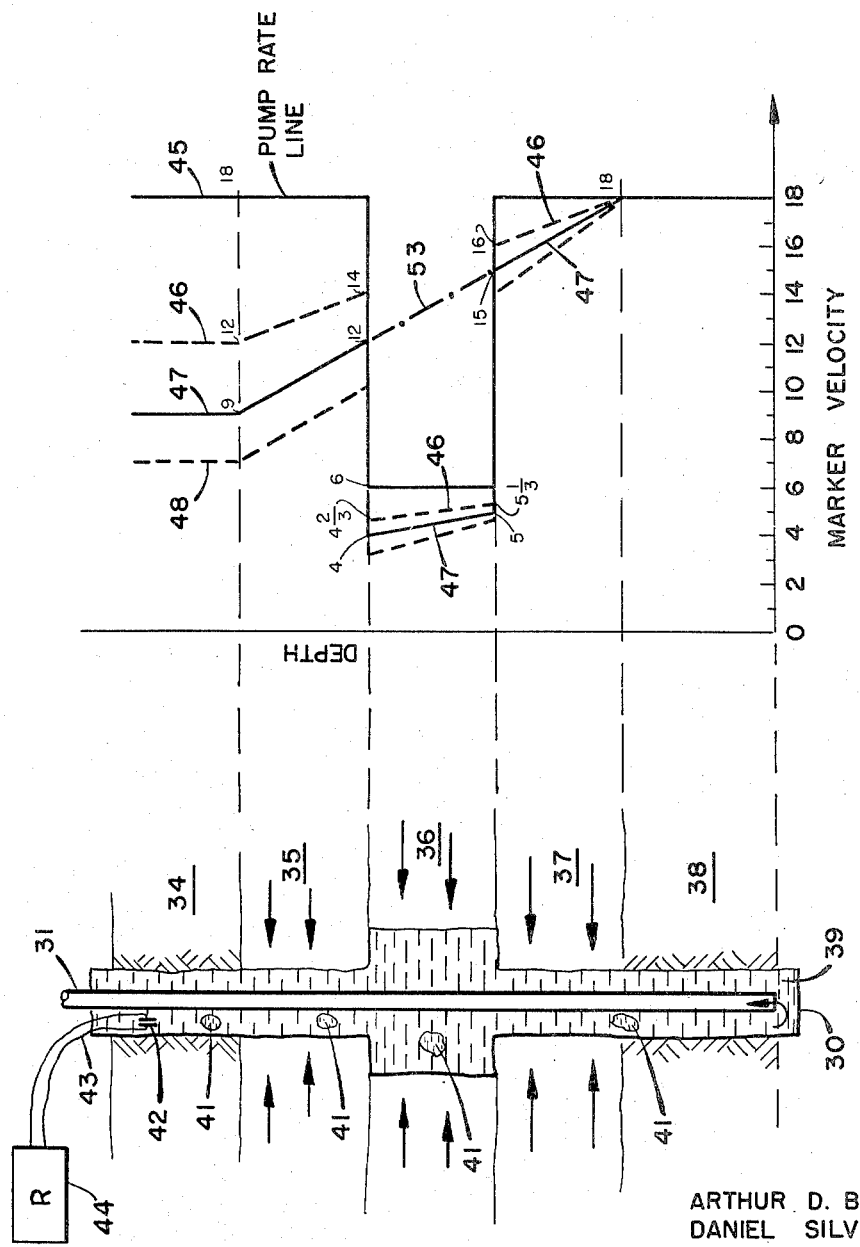

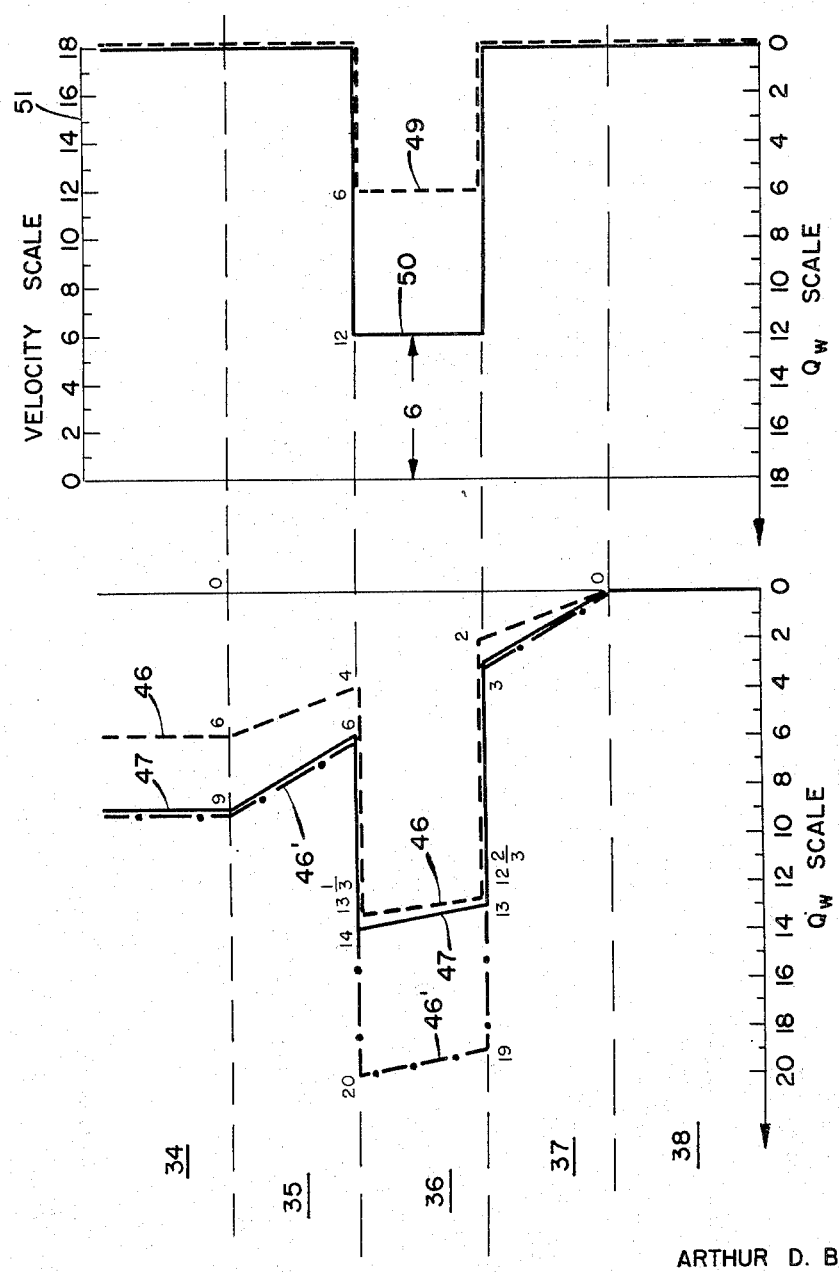

United States Patent Office 2,775,120
Patented Dec. 25, 1956

2,775,120

FLUID ENTRY DETECTION IN WELLS

Arthur D. Bennett and Daniel Silverman, Tulsa, Okla., assignors to Stanolind Oil and Gas Company, Tulsa, Okla., a corporation of Delaware Application January 2, 1953, Serial No. 329,398

7 Claims. (Cl. 73—155)

This invention relates to the making of measurements in wells for determination of the fluid velocities therein, particularly for the purpose of obtaining the fluid-production profiles of wells such as those which produce gas, oil, and water. More specifically, it is directed to making measurements by which the variations in cross-sectional area of the well bore may also be determined for any reason, particularly for taking into account the effect of such hole-size variations on the fluid-velocity determinations.

In any well measurements involving directly or indirectly the velocity of movement of fluids along the well bore, a knowledge of the bore-hole cross-sectional area is essential. Since the observed fluid velocity in a well bore is approximately inversely proportional to the cross-sectional area of the well bore, account must always be taken of changes in this area before the fluid-velocity changes from other causes, such as fluids entering or leaving the formations, can be correctly evaluated.

While logs of the variations in hole size made using mechanical calipers with arms that contact the hole walls are often helpful when they are available, they are frequently not sufficient for purposes of correcting fluid-velocity measurements since they do not always indicate the bore-hole cross-sectional area with the necessary accuracy. In fact, the accuracy of mechanical caliper devices is least just at the time when the greatest accuracy is needed, namely when the bore-hole size variations are extremely large and abrupt. Furthermore, in wells where the well tubing extends through the open-hole portion of the well which is of interest, the running of a device with arms to contact the well walls may be impossible without removal of the tubing.

It is accordingly a primary object of our invention to provide a method of carrying out measurements in well bores to obtain data from which both the well fluid-producing profile and the hole-size variations can be determined. A further object is to provide a method of obtaining data from which the hole-size variations of a well bore can be determined in the presence of a well tubing extending through the portion of interest. A still further object is to provide a method of making the foregoing measurements in wells normally producing two immiscible fluids, without error due to the production of one fluid while making measurements on the other. A still further object is to provide a method of making such measurements and taking into account the effect of the presence of one of the immiscible fluids during the making of velocity measurements on the other of the fluids. Still another and more specific object is to provide a method of measuring the profile of water production into a well bore in the presence of oil production, and the oil-production profile in the same well bore in the presence of water influx. Other and further objects, uses, and advantages of the invention will become apparent as the description proceeds.

Stated briefly, in accordance with our invention the foregoing and other objects are accomplished by producing a well through a tubing extending to a depth below the permeable formations, under two different conditions of bottom-hole pressure, where there is both production from the formations into the well bore and flow of fluid downwardly through the annulus outside the tubing from above the producing zone. Two sets of data are obtained in which there is a different ratio of fluid flow down the annulus to fluid flow from the formations. In some cases, also, the two extreme conditions may be used, where there is no production from the formation, and the only fluid movement is downwardly from the annulus thereabove, and where there is no fluid movement down the annulus, and all the fluids withdrawn through the well tubing are those produced from the well formations. Preferably the foregoing data are derived from measuring the velocity of one or more fluid markers or interfaces in the fluids in the well annulus outside the tubing, using as the conditioning agent a fluid which is miscible with the particular formation fluid under study.

According to an alternative embodiment of our invention, fluid-velocity data are also taken in a well bore in such a manner as to take account of the reduction in effective cross-sectional area of the well bore due to the non-miscibility of oil and water when one of these fluids is being produced into an annulus column of the opposite character. Such measurements or data may be further combined with measurements to provide data from which the variations in bore-hole size with depth can be determined independently of the fluid production from the well formations.

This will be better understood by reference to the accompanying drawings forming a part of this application and illustrating certain embodiments of the invention. In these drawings, Figure 1 is a cross-section of the lower portion of an idealized well with certain assumed hole-size variations and fluid productivities;

Figures 2, 3, and 4 are measured or computed logs of marker or interface velocity and other quantities obtained from the data recorded in the well bore of Figure 1; and Figures 5 and 6 are diagrammatic well cross-sections and accompanying logs of a well bore illustrating an alternative embodiment of our invention with different fluid conditions in the well annulus.

Referring now to these drawings in detail, and particularly to Figure 1 thereof, the lower portion of a well 30 is shown diagrammatically in idealized form and in cross-section, the well being equipped with a tubing 31 extending through the fluid-producing formations to a point near the well bottom. The well 30 penetrates a plurality of formations 34, 35, 36, 37, and 38. For the purposes of this illustration it is assumed that the upper and lower formations 34 and 38 are non-producing, that the middle formations 35, 36, and 37 are uniformly fluid-producing, and that the well bore is of uniform cross-sectional area everywhere but at formation 36 where the area of the annular space 39 between the tubing 31 and the well wall is three times that opposite the other formations.

In this embodiment of the invention, there is of importance a certain characteristic of a great many wells which produce both oil and water. When the bottom-hole pressure in these wells is relatively high and close to the value existing at static equilibrium after the well has been shut in for an extended period of time, it is frequently found that only one fluid—water—is produced. Oil production starts only when the bottom-hole pressure is reduced considerably below the static equilibrium value. Accordingly, for the purposes of the present illustration it will be assumed that under the test conditions well 30 produces only water. While the testing method is thus particularly applicable to locating the levels of water production, it is obviously similarly applicable to wells which produce oil as a single fluid, provided only that an appropriate conditioning liquid is utilized for filling the well bore.

It will therefore be assumed that well annulus 39 surrounding the tubing 31 is filled with water to a level substantially above the upper formation 34, as this is a condition found generally in wells of this type. With well 30 thus at static equilibrium, one or more markers 41 are placed in the fluid column outside the tubing by use of a suitable marker ejector such as that shown in Figure 3 of U. S. Patent 2,453,456, for example, the upper marker preferably being at least above permeable formation 35, as for example opposite the formation 34. These markers may comprise an aqueous liquid having a property contrasting with the well liquids, being for example salt water, if the well liquids are relatively fresh water or, alternatively, fresh water in case the well liquids are salt water. These markers 41 are detectable by an electrode pair 42 responsive to the electrical conductivity of the liquid, and connected by an insulated cable 43 to a surface indicating or recording instrument 44 such as a recording ohmmeter. No predetermined spacing or pattern of markers is necessary except that they should be separated sufficiently so that each marker is individually recognizable throughout the period of making measurements.

Next, removal of fluids through the well tubing 31 is begun, as by starting up conventional well pumping equipment, not shown, and the various markers 41 are followed as they move downwardly in the annular space 39. Preferably this is done by repeatedly traversing the electrode pair 42 up and down past the formations and thus determining the depth of each marker 41 at the end of each of several short, known intervals of time. From the data thus obtained, and on the assumption that the bottom-hole pressure does not change appreciably during the making of this first set of measurements, so that substantially no fluid enters the well bore, a velocity curve 45 as shown in Figure 2 may be plotted. This assumption is entirely justified in practice, as each of the successive logs of marker velocity is normally obtained in only a few minutes, with only a small change in the bottom-hole pressure of a few pounds per square inch. This curve 45 gives the volume-caliper measurement of the annulus 39 of the well 30 directly, in terms of the variations in marker velocity produced thereby. It will be observed that the marker velocity of eighteen units along the right-hand edge of Figure 2 is determined mostly by the volumetric pumping rate through tubing 31 and the normal cross-sectional area of the annulus 39. This line associated with the velocity of eighteen units will be designated as the "pump rate line." Due to the three-times area enlargement opposite formation 36, the observed velocity at this level decreases to one-third of its value in other parts of the well, namely to six units, and then returns to its normal value of eighteen units opposite the formations 37 and 38.

The reason for utilizing a plurality of the markers 41 is that the data from which the velocity curve is plotted can be obtained very rapidly by the repeated traversing of the electrodes 42. The desired information is thus obtained before the bottom-hole pressure has changed substantially from its static equilibrium value. Obviously, in some wells the same result can be obtained by using a single marker or interface and continuously following it or timing its travel through the various, successive, known intervals of depth in annulus 39, as long as the formation production is negligible compared to the tubing production rate. This is especially true of wells which produce with a large drawdown, so that pumping over an extended period of time, such as several hours, is necessary to bring about a substantial change in the bottom-hole pressure or the formation producing rate.

As pumping continues, the bottom-hole pressure decreases in a continuous fashion, while the formations 35, 36, and 37 begin to produce fluids into the well bore. Under the assumed conditions which are true of many wells, however, only water is produced until the bottom-hole pressure has been substantially lowered below its static value. At intervals during this drawdown process, the markers 41 are reestablished by a marker ejector in the annulus fluid column and followed to ascertain the velocity log corresponding to different values of the bottom-hole pressure, and thus to different values of the ratio of fluid flow down the annulus to fluid flow from the formations.

Strictly speaking, the bottom-hole pressure or the ratio of flows has a given fixed or constant value for only one instant of time during the prolonged drawdown period. It is permissible, however, to consider this value constant throughout each brief period of following of the markers 41, as the total change in the pressure or flow ratio value occurring during each period of marker following is small. Thus, at three different times during a drawdown which extends over a substantial length of time, the three velocity logs 46, 47, and 48 are obtained. Each is made quickly so as to be representative of virtually a single value of the pressure or flow ratio. The time intervals of substantial length between successive marker runs, however, insure that the values of bottom-hole pressure or flow ratio will differ considerably among the various logs. In the continuous drawdown the varying bottom-hole pressure thus has two aspects: for short times it is considered constant, while for long times it produces the desired change in conditions to give significantly different marker velocity logs.

To the extent that it can be assumed that each of these logs is obtained over a short interval of time, and that the change in bottom-hole pressure during this interval can be neglected—which is a condition often made possible by utilizing a plurality of interfaces, preferably spaced irregularly for easier identification—each of these curves corresponds to a single bottom-hole pressure for the production of water from the formations 35, 36, and 37. In the event that a satisfactory curve 45 of volume-caliper measurement has not been obtained, any two of these latter curves can be utilized to compute the well-caliper log. Conversely, this well-caliper information, either from velocity curve 45 or from computations utilizing two of the logs 46, 47, and 48, can be utilized in correcting any one of the latter curves for the effect of hole-size variations to obtain a fluid-productivity profile for the well 30.

An example will now be given of the interpretation of two of the logs 46, 47, and 48 to obtain both the hole-size variations and the fluid-productivity profile, although it will be understood this is frequently unnecessary when a satisfactory initial curve 45 of hole-size variations is available. For this purpose the logs taken at the higher bottom-hole pressures are preferred, so that logs 46 and 47 will be used rather than log 48, which may possibly be less accurate, as the possibility of oil production during the taking of data for this log is greater.

For this interpretation, the logs 46 and 47 have been replotted in Figure 3 to a scale designated as the $Q_w$ scale, $Q_w$ corresponding in a general way to the volumetric rate of production of water from the formations. This quantity has a real significance only at the level of formation 34, in that curve 46 shows the formation water to be one-third of the total production removed from well 30 through tubing 31. The $Q_W$ scale used here, however, is an artifice for computation purposes only and amounts simply to using the pump rate line of curve 45 as the zero of the $Q_W$ scale and marking off units of the same magnitude as the marker velocity units in the reverse direction, that is, toward the left from the pump rate line. In Figure 3, the magnitudes of the $Q_W$ units have been marked at the boundaries of the formations in the same manner as the marker velocity units were indicated for those logs in Figure 2.

The next step of interpretation is to adjust the curve 46 to make it coincide with curve 47 in the formations where the diameter is known and there is no fluid production, namely in formations 34 and 38. This is here accomplished by multiplying all abscissas of curve 46 by the factor 9/6=1.5, thus obtaining the dot-dash curve 46' plotted in Figure 3. Subtraction of curve 47 from curve 46' then produces the dashed-line curve 49 shown in Figure 4.

Except for absolute magnitudes, this is the volume caliper of the annulus 39 of this well. To obtain the true magnitudes of the volume-caliper variations of annulus 39 for this well, the abscissas of curve 49 must be multiplied by a correction factor, which is defined as the value of $Q_W$ for log 46 divided by the difference in $Q_W$ values for curve 46 and 47, all of which $Q_W$ values are taken in the formation 34. In the present case this factor is numerically equal to $$\frac{6}{(9-6)}$$

or, in other words, to 2. Applying the factor 2 to the abscissas of curve 49, the true caliper curve 50 is obtained which—when considered with reference to the velocity scale 51 superimposed on the top of Figure 4—shows the hole-size variations in well 30 in terms of their effect on the measured fluid velocities. Consequently, this is an indication of the true volume caliper log of the annulus 39 of this well and may be used in the same manner as curve 45 for correcting one of the fluid-input logs 46 or 47 to get the true fluid-productivity profile.

As is shown in Figure 2, this correction amounts to multiplying the abscissas of curve 47 opposite formation 36 by the factor 3 to obtain the dot-dash line 53. This is the true fluid-productivity line for the formation 36 that would have been obtained if the bore-hole size at this formation had been the same as at the others. The corrected final curve 47, with the portion 53 shown in Figure 2, thus demonstrates the uniform fluid production from each of the three formations 35, 36, and 37, which was assumed in the example.

Although this technique has been described as being applicable to the location of water production using a column of water in annulus 39, it will be apparent that it is also applicable to the location of oil production utilizing a column of oil in exactly the same way. For the purpose of establishing one or more markers in an oil column, a quantity of oil of different properties may be injected into the standing oil column at one or more places, and the marker location can be followed, as it progressively moves through the well by a device sensitive, for example, to the differential heat-diffusion properties of the natural and the marker oils; or radioactive tracer materials can be inserted at spaced locations in the oil column, and their positions can be subsequently followed or located by a radioactivity detector.

In the foregoing, where a well produces two fluids, it has been assumed that the testing for one may be carried out without production of the other fluid, or that the presence of the other fluid is without substantial effect on the measurements to locate the depths of production of the first fluid. It is, however, not always possible or advisable to neglect the presence of another fluid immiscible with the one for which the productivity profile is being established. In Figures 5 and 6 is shown a modification of our invention in which the location of water production takes account of the presence of oil production at or near the same zone and, conversely, the measurements for locating oil production take account of the nearby production of water.

Referring now particularly to Figures 5 and 6, an idealized well bore 60 is shown in cross-section. While it is not always true in a practical case, it is assumed that the well bore is of uniform cross-sectional area and that water is produced by a lower stratum 61, while oil is produced by a separate upper stratum 62. For ease of explanation it is further assumed that these are the only two locations of fluid production into the well bore. Also, it is assumed that, at the start of the test, water completely fills the bottom of the well to a depth substantially above the oil-producing stratum 62, so that the oil-water interface in the annulus liquid column is considerably above the portion of the well illustrated. One or a plurality of markers 41 are then placed in this water column, and withdrawal of fluids through tubing 31 from the bottom of well 60 is started. This produces a downward movement of the annulus liquid column and the markers therein, which is followed by the electrodes 42 producing indications at the ground surface. Under the above assumptions, also, oil begins to enter the column from stratum 62; however, being of less specific gravity than the water, it rises through the column of water in a stream 64, which is shown as a consolidated liquid despite the fact that in practice it may comprise a stream of fine droplets or globules of substantial size. The effect of this stream, however, is to act as a constriction or a reduction of the effective well-bore cross-sectional area, insofar as the movement of markers 41 at and above the location of oil stratum 62 is concerned. Consequently, data are obtained at a more or less stabilized producing rate, with fluids both moving down the annulus of well 60 and simultaneously entering from the formations 61 and 62, which data results in the marker velocity log 66 shown on the right of Figure 5 where it is correlated in depth with the well formations in the figure.

The effect of the oil production from stratum 62, under the conditions of bottom-hole pressure existing during the test, is shown on this figure in the upper part as a displacement of the marker velocity curve to the right, or toward a higher value of velocity. At this time, however, it is not known whether this increase in velocity is due to oil production or to a variation in cross-sectional area of the well bore itself.

As production of well 60 through tubing 31 continues, a condition is ultimately reached corresponding to that shown in Figure 6. In this situation the well 60 is substantially filled with a column of oil, the oil-water interface 68 having now been drawn down to the tubing inlet. One or more markers 69 are then placed in this oil column and followed by a detector 70, producing indications at the ground surface over an insulated cable 43, from which indications a marker velocity log such as log 71 shown in Figure 6 can be obtained. As appears on this log, the oil-column marker velocity increases at the level of oil stratum 62 due to the added production of oil from this formation. It also increases opposite the water formation 61 and therebelow due to the constrictive effect of the water also entering and moving downwardly to the tubing inlet, which is similar in effect to a reduction in the well-bore cross-sectional area. Upon continuing the production of well 60 through tubing 31 at the same rate, a condition of producing equilibrium is finally reached, and a velocity log corresponding to log 72 is obtained by following the travel of markers introduced in the oil column. Log 72 is generally similar to 71 except that fluid movement down the annulus has ceased and fluid production from the formations has increased to a maximum, stabilized value.

In the interpretation of curves 66, 71, and 72 of Figures 5 and 6 it is impossible, without knowledge of the formations, to determine from logs 71 or 72 whether the production of stratum 61 and stratum 62 is oil or water. In other words, the fluid produced from both of the strata could be either oil or water. On the other hand, the curve 66 is available to identify the main water production as coming from the stratum 61, and its effect in producing the constriction effect of curve 71 can then be computed and subtracted. This gives substantially the true input profile of the oil stratum without the effect of entering water. Conversely, the oil-production profile having been thus determined, showing that the main oil production is from the stratum 62, its constriction effect on the water-input profile 66 of Figure 5 can be calculated and eliminated. If the cross-sectional area of the well 60 also varies with depth, this fact can be determined and its effect computed and corrected for in the manner described above in connection with Figure 1, by utilization of the curve 45.

To summarize the foregoing, it may be stated that, under the test conditions described, the entry of water is first so determined that the oil entry acts in a second-order effect, and conversely the oil entry is determined under such conditions that the entry of water causes a second-order effect. The principle of operation of this modfication of the invention is so to condition the well, or to operate under such well conditions, that the main body of fluid present in the well annulus as a conditioning agent is that fluid which is miscible with the particular formation fluid under study. Thus, for locating the levels of water production into the well bore a column of predominantly water is provided, and water-miscible markers are established therein, while for the detection of oil production a column of oil and oil-miscible markers are used.

In creating the conditions shown in Figure 6 water tends to fall through an oil column at varying velocities, velocities of travel downwardly of water through oil columns having been observed as of the order of six feet per minute. Conversely, to confirm the condition illustrated in Figure 5, oil has been observed to rise through a column of water standing opposite the well formations with velocities of the order of twenty feet per minute, more or less. These relative velocities obviously depend in part both on the difference in density between the oil and the water and on the viscosity of the liquid which is present in the continuous phase. Thus, water droplets tend to fall through viscous oil more slowly than droplets of oil tend to rise through less viscous water.

While in many cases the constrictive effect of the oil or water produced during the test for the opposite of the two liquids is not large, on a percentage basis, being of the order of perhaps one percent for each ten barrels of fluid produced per day in an average-size well bore, there are nevertheless some conditions under which these corrections can be appreciable and therefore should be carried out. Particularly is this true if the bore-hole itself is small and varying in cross-sectional area.

While our invention has thus been described in terms of the foregoing specific embodiments and modifications, it is to be understood that these are for illustrative purposes only and that still further modifications or embodiments will be apparent to those skilled in the art. The invention, therefore, should not be considered as limited to the exact details set forth, but its scope is properly to be ascertained by reference to the appended claims.

We claim:

1. The method of testing wells to obtain data from which both a fluid-production profile and a volume-caliper log can be determined comprising, in combination, the steps of producing a well through a tubing extending to a depth below the producing formations under such conditions of bottom-hole pressure that there is fluid flow both from the formations and from the well annulus above the formations, the ratio of formation and annulus flows having a first value, placing at least one detectable marker in the annulus fluid column at a point at least as high as the uppermost producing formation, following and recording the movement of said marker downwardly past the producing formations to the tubing inlet, changing the bottom-hole pressure conditions to create a second ratio of said flows, placing a second detectable marker in said annulus fluid column above the uppermost producing formation, and following and recording the movement of said second marker downwardly past said producing formations to the tubing inlet, whereby data are obtained for plotting two logs of marker velocity as a function of depth from which a fluid-production profile and a volume-caliper log may be computed independently of each other.

2. The method according to claim 1 in which, for one value of said flow ratios, the flow of fluids from the formations is substantially zero.

3. The method according to claim 1 in which, for one of said flow ratios, the flow of fluids from the well annulus is substantially zero.

4. The method according to claim 1 in which both said first and second values of the ratio of said flows lie within a range where only a single fluid is produced by the well formations.

5. The method of testing wells which comprises, in combination, the steps of establishing in the annulus fluid column of a well opposite the producing formations a plurality of spaced detectable markers, producing said well through a tubing extending to a depth below the producing formations under such conditions of bottom-hole pressure that the ratio of flow of fluid from the formations to the flow of fluid down the well annulus from above the formations has one value, repeatedly locating at closely spaced intervals of time the position of each of said markers as it moves with said fluid column downwardly toward the tubing inlet, changing the producing conditions in said well to establish a second value of the ratio of said flows, establishing in the annulus fluid column a second plurality of spaced detectable markers, and repeatedly locating at closely spaced intervals of time the position of each of said second plurality of markers as it moves downwardly toward the tubing inlet, whereby data are obtained for plotting two logs of the velocity of flow in said annulus from which the fluid-producing profile and the variations in hole size may be computed independently of each other.

6. The method as set forth in claim 5 in which said first plurality of markers are established with the well substantially at static equilibrium, and wherein the step of repeatedly locating said plurality of markers is carried out before there is substantial production of fluid from the well formations.

7. The method of testing a well which produces both water and oil and in which there is at static equilibrium a fluid column extending to a substantial height above the producing formations, and wherein the oil-water interface also stands above said formations, which method comprises, in combination, the steps of introducing into the column of water extending past said formations a plurality of spaced detectable water-miscible markers, at least one of said markers being located at a point above said producing formations, producing said well through a tubing extending to a depth below the producing formations, following and recording the motion of each of said plurality of markers while it moves downwardly past the producing formations toward the tubing inlet, continuing said producing step until the oil-water interface is drawn down to the level of said tubing inlet, introducing a plurality of spaced detectable oil-miscible markers into the oil column in said well, at least one of said markers being at a point near the top of the uppermost producing formation, producing said well through said tubing to draw down said oil-miscible markers along with said oil column toward the tubing inlet, and following and recording the movement of each of said markers, whereby data are obtained for plotting two logs of marker velocity on one of which logs the water production is indicated by increases in marker velocity and the oil production by minor decreases in said marker velocity, and on the other of which logs the oil production is indicated by increases of velocity and the water production is indicated indirectly as a minor velocity increase due to the effective decrease of bore-hole cross-sectional area due to the immiscibility of the water and oil.

References Cited in the file of this patent

UNITED STATES PATENTS

| | | |
|---|---|---|
| 2,595,578 | Hartline et al. | May 6, 1952 |
| 2,595,610 | Silverman et al. | May 6, 1952 |
| 2,674,877 | Silverman et al. | Apr. 13, 1954 |